(12) United States Patent
Ghanem et al.

(10) Patent No.: US 12,233,486 B2
(45) Date of Patent: Feb. 25, 2025

(54) ASSEMBLY AND JOINING TABLE, SYSTEMS AND METHODS FOR AUTOMATED OPERATIONS OF THE SAME

(71) Applicant: ProcessChamp, LLC, Columbus, OH (US)

(72) Inventors: George Ghanem, Columbus, OH (US); Ron Brown, Wilmot, NH (US)

(73) Assignee: ProcessChamp, LLC, Columbus, OH (US)

( * ) Notice: Subject to any disclaimer, the term of this patent is extended or adjusted under 35 U.S.C. 154(b) by 0 days.

(21) Appl. No.: 18/442,207

(22) Filed: Feb. 15, 2024

(65) Prior Publication Data

US 2024/0181578 A1 Jun. 6, 2024

Related U.S. Application Data

(62) Division of application No. 18/121,963, filed on Mar. 15, 2023.

(60) Provisional application No. 63/320,455, filed on Mar. 16, 2022.

(51) Int. Cl.
| | |
|---|---|
| *B23P 19/04* | (2006.01) |
| *B23K 37/006* | (2025.01) |
| *B23K 37/04* | (2006.01) |
| *B25J 9/00* | (2006.01) |
| *B25J 9/16* | (2006.01) |
| *B25J 11/00* | (2006.01) |

(52) U.S. Cl.
CPC ........ *B23K 37/0461* (2013.01); *B23K 37/006* (2013.01); *B23K 37/0443* (2013.01); *B23P 19/04* (2013.01); *B25J 9/0084* (2013.01); *B25J 9/0096* (2013.01); *B25J 9/1697* (2013.01); *B25J 11/005* (2013.01); *B25J 9/1687* (2013.01); *G05B 2219/40032* (2013.01)

(58) Field of Classification Search
CPC ............. B23K 37/0461; B23K 37/006; B23K 37/0443; B23P 19/04; B25J 9/0084; B25J 9/0096; B25J 9/1697; B25J 11/005; B25J 9/1687; G05B 2219/40032
See application file for complete search history.

(56) References Cited

U.S. PATENT DOCUMENTS

| | | | |
|---|---|---|---|
| 8,157,155 | B2 | 4/2012 | Diez et al. |
| 9,636,793 | B2 | 5/2017 | Morgan |
| 10,095,214 | B2 | 10/2018 | Ghanem |
| 10,101,725 | B2 | 10/2018 | Ghanem |
| 2020/0171651 | A1 | 6/2020 | Kuriya et al. |
| 2020/0262057 | A1 | 8/2020 | Saez et al. |
| 2020/0262078 | A1 | 8/2020 | Saez et al. |
| 2020/0262079 | A1 | 8/2020 | Saez et al. |

(Continued)

*Primary Examiner* — Ryan J. Walters
(74) *Attorney, Agent, or Firm* — Standley Law Group LLP; Jeffrey S. Standley; Adam J. Smith

(57) ABSTRACT

An assembly and joining table, such as with weld splatter protection features, are disclosed along with systems and methods for operating the same in at least partially automated fashion. The table includes holders positioned about platform providing a work surface. Parts are placed within at least certain of the holders for joining to create an assembly. The holders include conductive surfaces and may include a sinuous recessed channels for wiring connecting the conductive surfaces to an electrical ground. A controller may operate motors of the table and command operations of robots for material handling and/or joining, such as based on data from a machine vision system viewing the table.

20 Claims, 16 Drawing Sheets

(56) References Cited

U.S. PATENT DOCUMENTS

| | | |
|---|---|---|
| 2020/0377004 A1 | 12/2020 | Zhang et al. |
| 2020/0377012 A1 | 12/2020 | Saez et al. |
| 2020/0380273 A1 | 12/2020 | Saez et al. |
| 2020/0398743 A1 | 12/2020 | Huber et al. |
| 2021/0237200 A1 | 8/2021 | Wang et al. |
| 2021/0237211 A1 | 8/2021 | Saez et al. |
| 2021/0237212 A1 | 8/2021 | Saez et al. |
| 2022/0016762 A1 | 1/2022 | Ghanem et al. |
| 2022/0152785 A1 | 5/2022 | Skurkis et al. |
| 2022/0176564 A1 | 6/2022 | Saez et al. |

ASSEMBLY AND JOINING TABLE, SYSTEMS AND METHODS FOR AUTOMATED OPERATIONS OF THE SAME

CROSS-REFERENCE TO RELATED APPLICATIONS

This application is a divisional of U.S. application Ser. No. 18/121,963 filed Mar. 15, 2023, which claims the benefit of U.S. Provisional Application Ser. No. 63/320,455 filed Mar. 16, 2022, the disclosures of each of which are hereby incorporated by reference as if fully restated herein.

TECHNICAL FIELD

Exemplary embodiments relate generally to a table for assembling and/or joining components as well as systems and methods for utilizing the same.

BACKGROUND AND SUMMARY OF THE INVENTION

Welding is performed to join pieces together to form a larger assembly. Welding tables are sometimes used which may provide a work surface for pieces being assembled or joined and/or grounding for certain weld equipment. Sometimes, parts need to be moved into different orientations manually at the weld table for joining into the assembly. Therefore, what is needed is an automated assembly and joining table.

Furthermore, during joining, weld material sometimes gets splattered about the work surface. This can be problematic, particularly when contacting certain electrical components of the welding equipment. Therefore, what is needed is an assembly and joining table with weld splatter protection features.

An automated assembly and joining table is disclosed, along with systems and methods for utilizing the same. The table may comprise a number of holders, such as in a unique configuration. The holders may comprise two portions for holding and/or temporarily securing a part, such as for joining.

The table may be configured to reduce or eliminate weld splatter from getting into problematic places. For example, without limitation, the holders may comprise lower portions with a zig-zag shaped channel for a grounding wire for welding. The lower portions and/or channels may be configured to reduce or prevent weld splatter from contacting the grounding wire which might cause an electrical short. As another example, without limitation, an inverted rack and pinion arrangement may be used.

Portions of the table may be moveable. In this manner, the table may be configured, and reconfigured, to hold a variety of parts for assembly, such as by a number of robots. The table may be controlled by a controller, which may be part of a larger system for controlling automated assembly and/or inspection of the parts and/or assemblies created, such as by utilizing artificial intelligence software. This may permit wholly or partially fixtureless manufacture.

The weld splatter protection features, including but not limited to the channels and/or inverted rack and pinion arrangement, may be particularly helpful in the context of at least partially automated assembly and/or joining where little to no human supervision is provided, or even if provided, as little human interaction as possible may be desired. Weld splatter may provide an electrical short, prevent proper operation, of the like, requiring production pause or shut down to correct. When human operated, humans can make certain judgments or adjustments to prevent splatter or may manually clean up splatter as needed. In the context of automated assembly, this may not be practically available, and thus unique needs for weld splatter protection may exist.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 8 is a flow chart with exemplary logic for utilizing the table of FIG. 1 in an automated assembly environment.

DETAILED DESCRIPTION OF EXEMPLARY EMBODIMENT(S)

Figure 1:
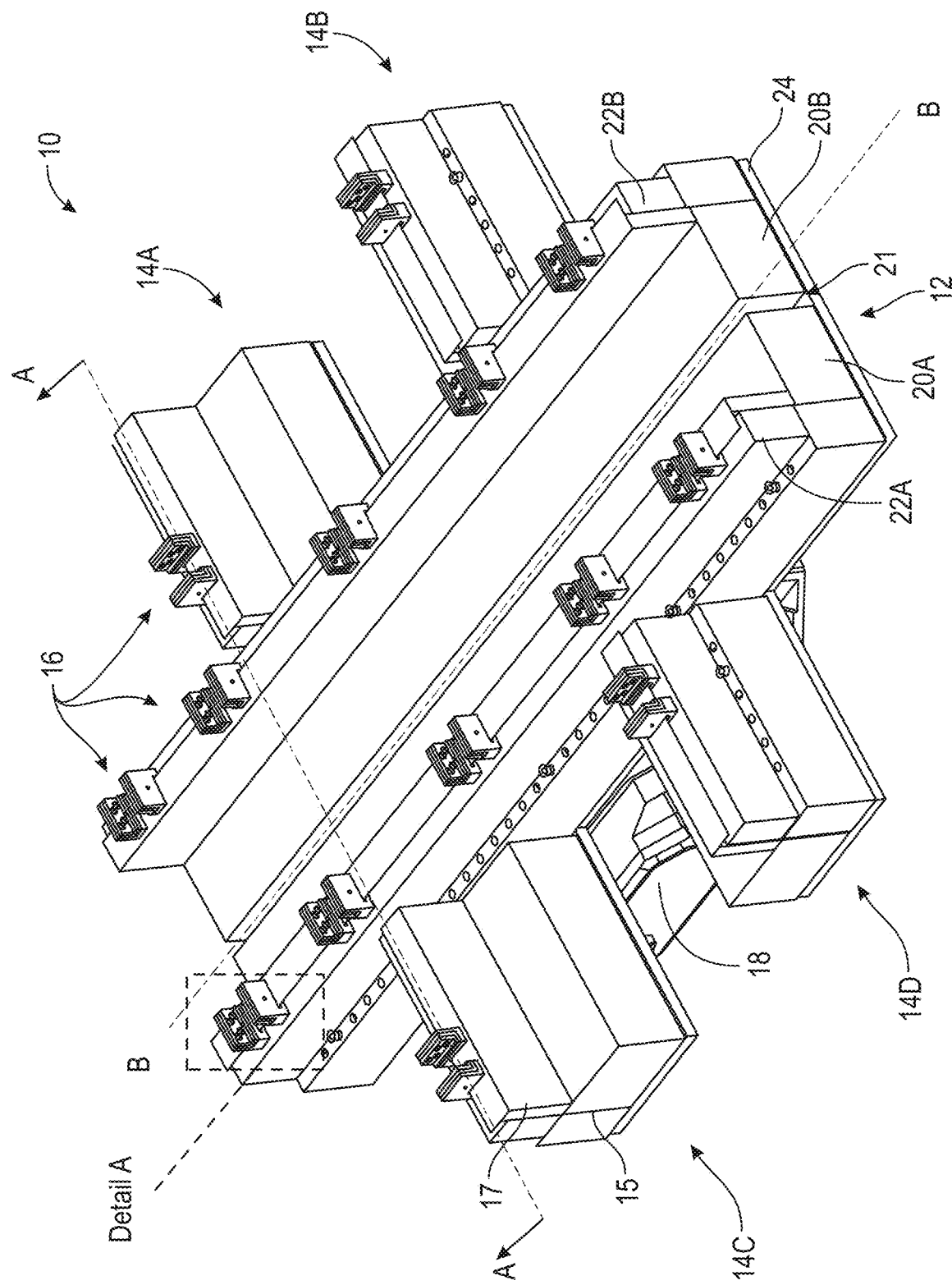
FIG. 1 is a perspective view of an exemplary assembly and joining table also indicating cutting plane line A-A and centerline B-B.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

FIG. 1 through FIG. 5B illustrate an exemplary assembly and joining table 10. The table 10 may comprise a base 18. A platform 24 may be mounted to the base 18 to provide a work surface. In exemplary embodiments, the base 18 may comprise, or be associated with, one or more motorized devices 25 for rotating or otherwise moving the platform 24 and connected components. The motorized devices 25 may comprise one or more motors and connection components (e.g., gears, belts, levers, chains, sprockets, cams, combinations thereof, or the like). The table 10 may include more than one platform 24 and/or work surface.

A central portion 12 may be mounted, or otherwise connected, to the platform 24. Alternatively, the central portion 12 may comprise some or all of the platform 24 and/or be mounted to the base 18. A number of wing portions 14 may extend from the central portion 12. In exemplary embodiments, the platform 24 may underly the central portion 12 and some or all of the wing portions 14. Alternatively, the wing portions 14 may comprise the platform 24 and/or be mounted to the base 18. The platform 24 may comprise a single, unitary sheet or multiple components affixed to the base 18, the central portion 12, the wing portion(s) 14, and/or one another. In exemplary embodiments, two wing portions 14A, 14B may extend from a first side of the central portion 12 and two other wing portions 14C, 14D may extend from an opposing side of the central portion 12. The wing portions 14A-14D on opposing sides of the central portion 12 may be fully or substantially aligned with one another, such that the table 10 is fully or substantially symmetrical across centerline B-B, though such is not required.

The central portion 12 may comprise a lower portion 20 and an upper portion 22. In exemplary embodiments, without limitation, a first lower portion 20A and a second lower portion 20B are provided at the platform 24 such that a gap 21 extends between the first and second lower portions 20A, 20B. Each of the first and second lower portions 20A, 20B may comprise a respective one of a first and second upper portions 22A, 22B. Each of the wing portions 14 may comprise a lower portion 15 and an upper portion 17.

Each of the platform 24, the central portion 12, and/or the wing portion(s) 14 may define separate work surfaces or a unitary work surface. The upper and lower portions 20, 22, the central portion 12, and/or the wing portions 14 may be physical separate components or may be portions of unitary components.

The table 10 may comprise a series of holders 16. In exemplary embodiments, without limitation, ten of the holders 16 may be spaced apart along the central portion 12. For example, without limitation, five of the holders 16 may be spaced apart along the first upper portion 22A and five of the holders 16 may be spaced apart along the second upper portion 22B. The holders 16 on opposing sides of the central portion 12 may be fully or substantially aligned with one another, such that the table 10 is fully or substantially symmetrical across centerline B-B, though such is not required. Each of the wing portions 14 may comprise a single one of the holders 16. In exemplary embodiments, without limitation, the holder 16 on the first wing portion 14A may be unaligned with the holder 16 of the second wing portion 14B, and/or the holder 16 of the third wing portion 14C may be unaligned with the holder 16 of the fourth wing portion 14D. For example, without limitation, the holder 16 of the first wing portion 14A may be proximate to the central portion 12 while the holder 16 of the second wing portion 14B may be relatively distal to the central portion 12, and/or the holder 16 of the fourth wing portion 14D may be proximate to the central portion 12 while the holder 16 of the third wing portion 14C may be relatively distal to the central portion 12. The illustrated and/or described arrangement of holders 16 is merely exemplary and is not intended to be limiting. Any number of holders 16 may be provided at the table 10 in any arrangement. For example, without limitation the table 10 may comprise between 1 and 20 of the holders 16. In exemplary embodiments, 14 of the holders 16 are utilized, such as in the arrangement shown.

Figure 2A:
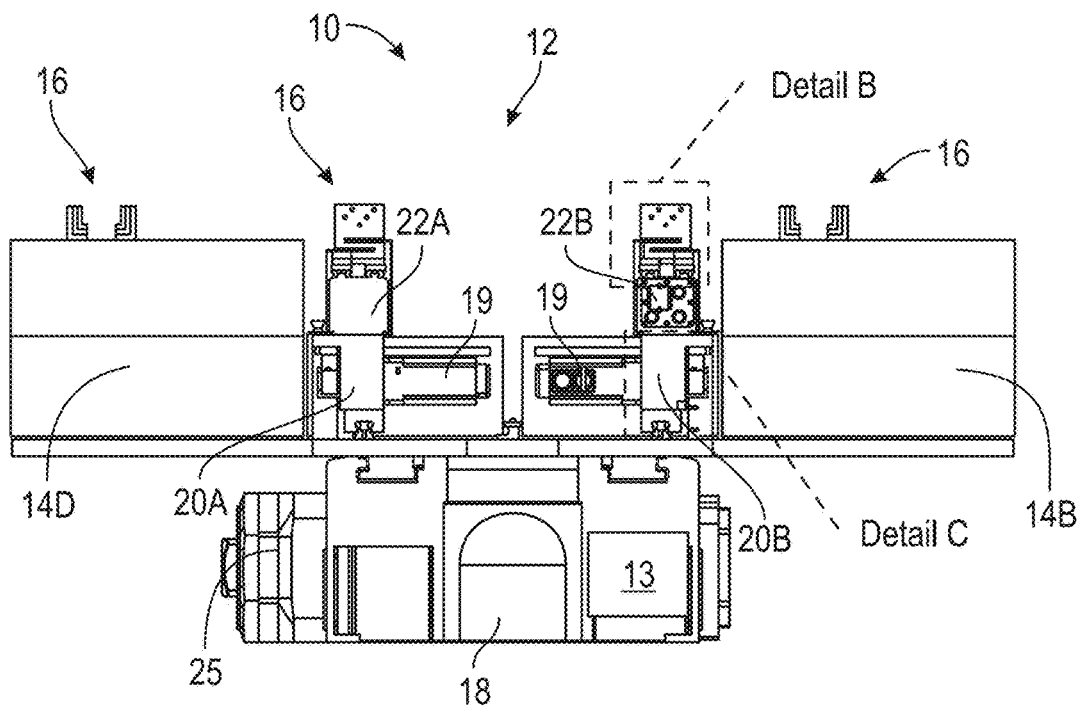
FIG. 2A is a sectional view of the table of FIG. 1 taken along cutting plane line A-A, also indicating detail B and detail C.
Figure 2B:
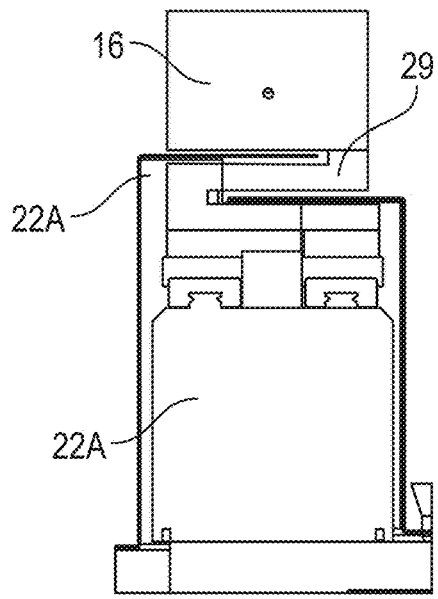
FIG. 2B is a detailed sectional view of detail B of FIG. 2A.
Figure 3A:
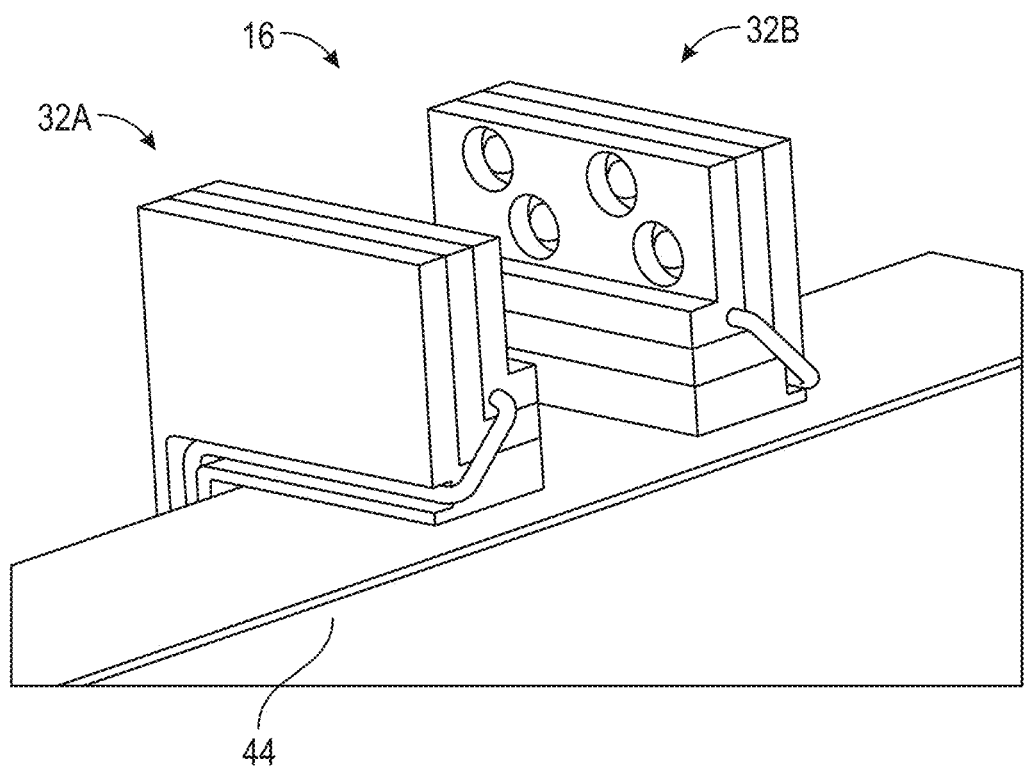
FIG. 3A is a perspective view of detail A of FIG. 1.
Figure 3B:
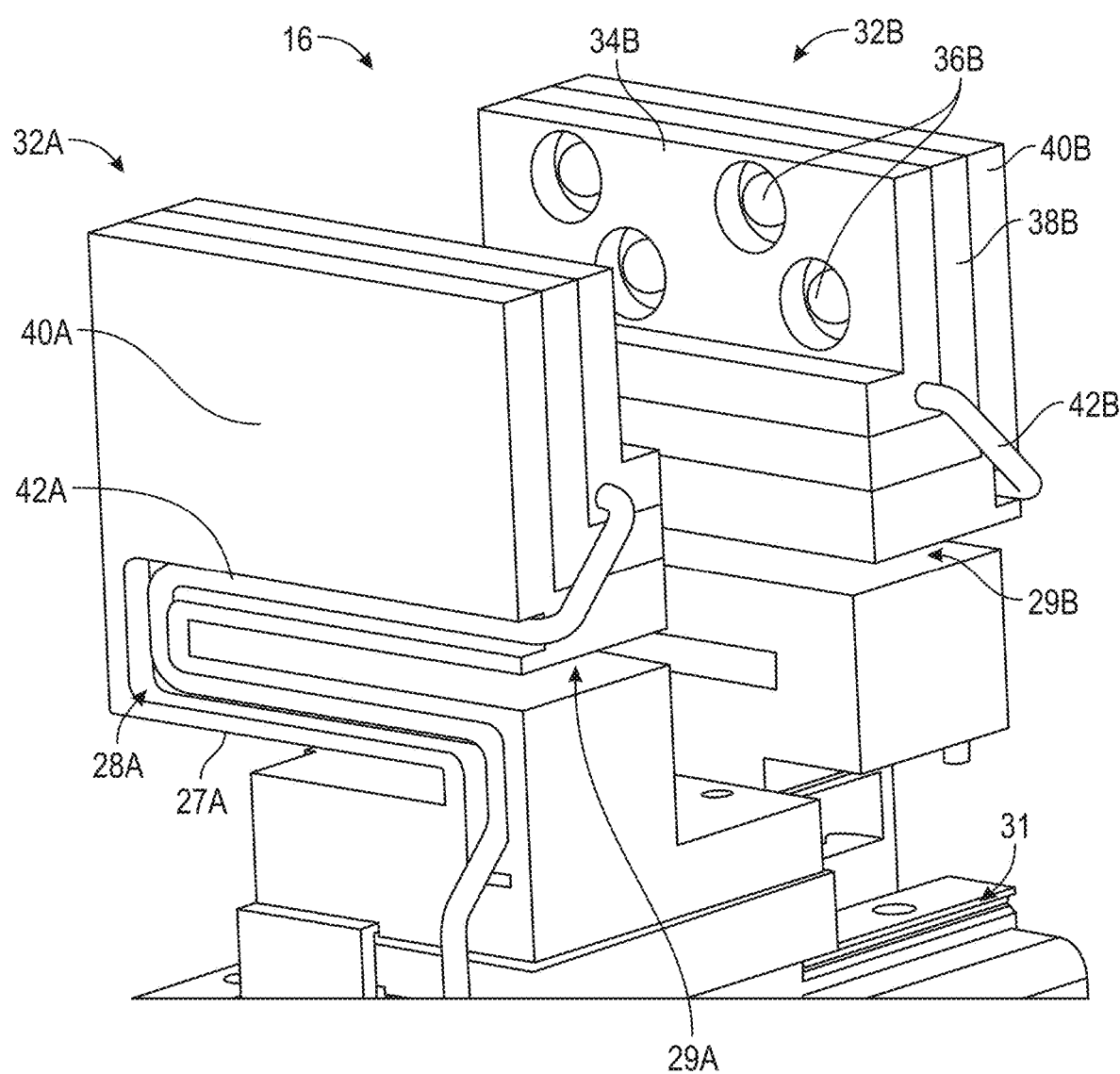
FIG. 3B is a perspective view of detail A of FIG. 1 with certain components of the table not shown to reveal additional parts of the holder.

As illustrated with particular regard to FIG. 2A, motorized devices 19 may reside at, or be associated with, the central portion 12. The motorized devices 19 may comprise motors and connection components (e.g., gears, belts, levers, chains, sprockets, cams, combinations thereof, or the like). The motorized devices 19 may be configured to permit movement, such as sliding movement, of the first and second lower and upper portions 20A, 22A, 20B, 22B of the central portion 12, such as relative to one another, the platform 24, and/or the wing portions 14.

As illustrated with particular regard to FIGS. 2B-3B, each of the holders 16 may comprise a first portion 32A and a second portion 32B. In exemplary embodiments, without limitations, the first and second portions 32A, 32B may oppose one another. The first and second portions 32A, 32B may be moveable relative to one another, such as to grab, clamp, accept, or secure a variety of different types and/or kinds of parts.

The first and second portions 32A, 32B may be moveable along the central portion 12. For example, without limitation, one or both of the first and second portions 32A, 32B may be provided on a sliding rail 31. The sliding rail may extend along or between the upper 22 and lower 20 portions. Motors may be provided which are configured to move the first and/or second portions 32A, 32B relative to one another. Some or all of the holders 16 may be otherwise moveable, such as for rotation, sliding movement along portions of the table 10, combinations thereof, or the like.

The holders 16 may be installed such that faces of the first and second portions 32 face fully or partially perpendicular to a longitudinal axis of the central portion 12 and/or wing portion 14 on which they are installed, though such is not required.

Each of the first and second portions 32A, 32B comprise a channel 28. The channel 28 may be defined by a lower portion 27 of the holder 16. The lower portion 27 may comprise a sinuous shape, such as but not limited to, in a zig-zag, "S", "Z", chicane, combinations thereof, or the like shape. The channel 28 may form a sinuous passageway, such as but not limited to, in a zig-zag, "S", "Z", chicane, combinations thereof, or the like pattern. Any shape or configuration of the lower portion 27 and/or the channel 28 may be utilized. A portion of the lower portion 27 and/or the channel 28 may be configured to accommodate a portion of the upper portion 22A in exemplary embodiments, without limitation.

Each of the first and second portions 32A, 32B define a slot 29. The slots 29A, 29B may be configured to accommodate a portion of the upper portion 22. In this manner, a portion of the upper portion 22, and/or a separate layer, may be installed within at least some of the holders 16. The upper portion 22, and/or a separate layer, may provide protection from weld splatter. The upper portion 22, and/or a separate layer, may act as a stabilizing rail for the holders 16 to slide along in exemplary embodiments, without limitation. In exemplary embodiments, the channel 28 may extend from a location adjacent to a conductive surface 34, laterally in a first directions along the slot 29, downward below the slot 29, laterally in a second direction along the slot 29 where the second direction opposes the first direction, and downward to a location below the slot 29.

The holders 16 may be configured to accept, and temporarily secure, various parts. For example, without limitation, the holders 16 may be configured to provide clamping/compressive forces to the part, friction fit, and/or secure, grip, or otherwise contact the part by normal forces. Alternatively, or additionally, the holders 16 may be configured to secure parts by normal forces and/or provide lateral stability against movement of parts within the holders 16. The portions 32 of the holders 16 may be adjustable, such as for securing the part by way of non-limiting example. Motors may be provided for moving the same.

Each of the portions 32 may comprise a mounting substrate 40. The mounting substrates 40A, 40B may comprise one or more metals, though such is not required.

Each of the portions 32 may comprise a conductive portion 34. In exemplary embodiments, without limitation, the conductive portions 34A, 34B may comprise a layer or plate forming one or more conductive surfaces. The conductive portion 34 may comprise beryllium copper, though any electrically conductive material may be utilized.

Each of the portions 32 may comprise an insulating portion 38. In exemplary embodiments, without limitation, the insulating portions 38A, 38B may comprise a layer or plate. The insulating portion 38 may comprise epoxy fiber glass laminate, such as but not limited to G-10, though any fully or partially insulating material may be utilized. In exemplary embodiments, without limitation, the insulating portion 38 may be provided rearward of the conductive portion 34 and may be fully coextensive with a rear surface of the conductive portion 34 so as to provide electrical insulation. The insulating portion 38 may electrically isolate the conductive portion 34 from the mounting substrate 40 and/or a remainder of the table 10.

In exemplary embodiments, without limitation, the insulating portion 38 may be provided atop some or all of the mounting substrate 40, and the conductive portion 34 may be provided atop some or all of the insulating portion 38. Fasteners 36 may be passed through some or all of the conductive portion 34, the insulating portion 38, and/or the mounting substrate 40 such as to connect the conductive portion 34 and the insulating portion 38 to the mounting substrate 40. A first set of the fasteners 36A may be used in the first portion 32A and a second set of the fasteners 36B may be used in the second portion 32B. In exemplary embodiments, without limitation, the fasteners 36 comprise ceramic screws, though any type of fastener or any fully or partially non-conductive material may be utilized. Any number and/or type of fasteners 36 may be provided in any arrangement.

The channel 28 of each of the holders 16 may be configured to accommodate a wire 42. The wire 42 may comprise a single or multistranded electrically conductive material, which may be wrapped in insulating material in exemplary embodiments. The wire 42 may be configured for extension from the conductive portion 34 to a ground, which may be part of the table 10 or an electrical and/or physical ground associated with the table 10 or separate from the table 10. In this manner, a consistent and high-quality weld may be provided. The channel 28 and/or the lower portion 27, particularly when sinuous in shape, may be configured to protect the wire 42 from weld spatter, which may cause an electrical short. A single or multiple wires 42 may be used with the table 10 and the various holders 16.

Figure 4A:
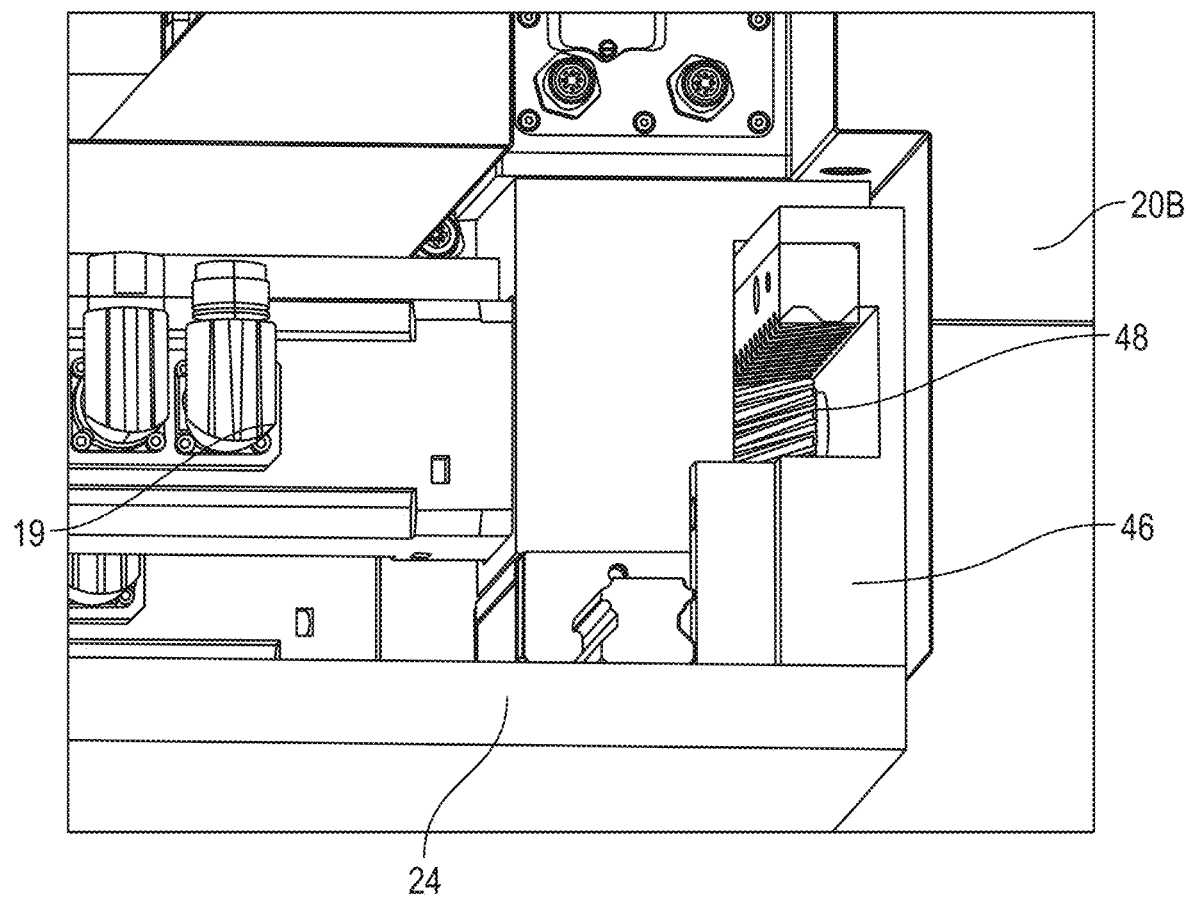
FIG. 4A is a detailed, perspective sectional view of detail C of FIG. 2A.
Figure 4B:
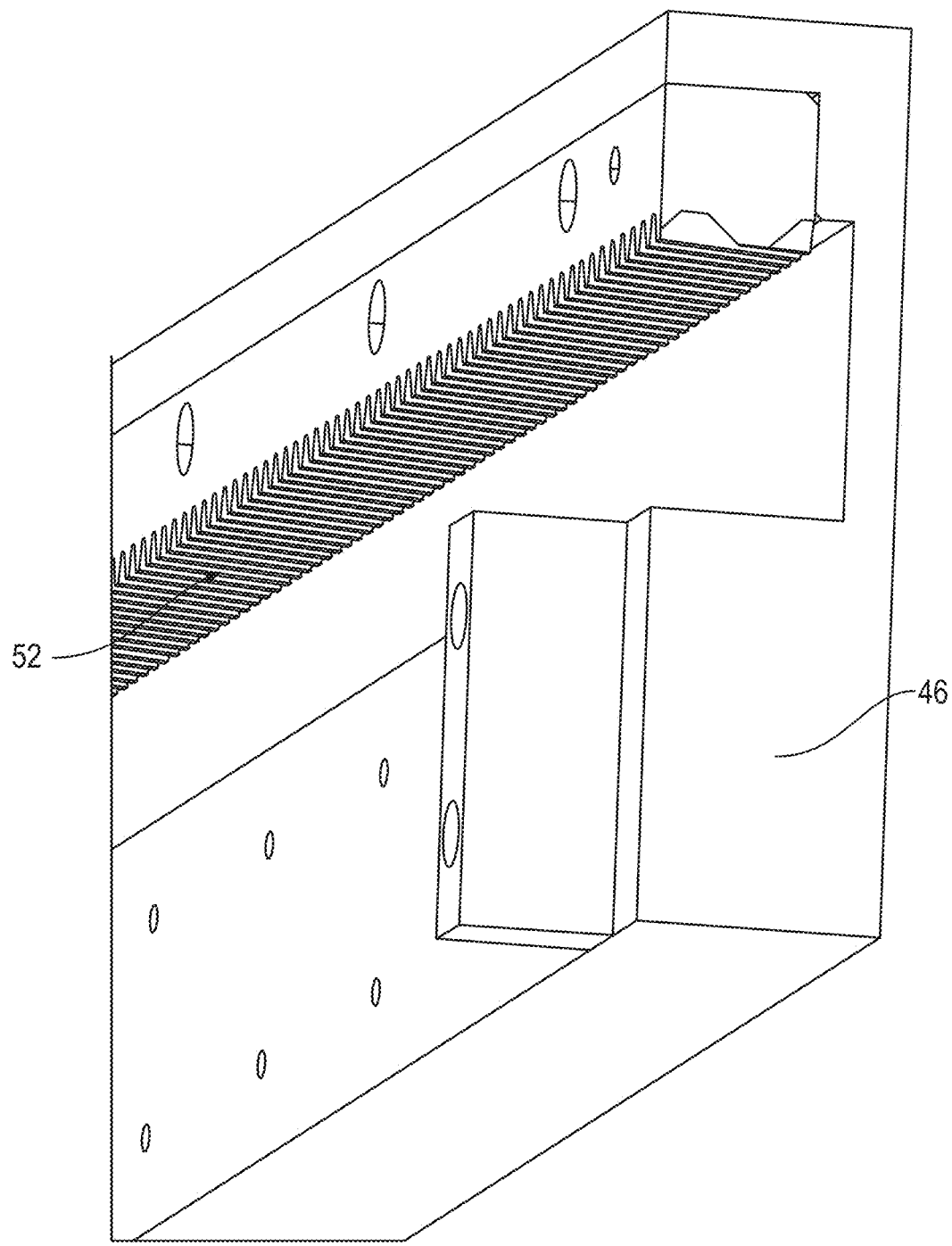
FIG. 4B is a perspective view of a rack of FIG. 4A shown in isolation.

As illustrated with particular regard to FIGS. 4A-4B, a rack 52 and pinion gear 48 arrangement may be utilized with the table 10. In exemplary embodiments, the rack 52 and the pinion 48 may be part of a rack subassembly 46. The rack subassembly 46 may be provided at, or within, each side of the central portion 12, such as to move the sides (i.e., on either side of the gap 21) of the central portion 12 relative to one another. In exemplary embodiments, without limitation, the wing portions 14 may be attached to Operations of the Same the central portion 12 such that the wing portions 14 move with the connected side of the central portion 12. In exemplary embodiments, without limitation, the lower portions 20 of the central portion 12 may each comprise a rack assembly 24.

The rack assembly 24 may comprise a downward facing rack 52. Notably, this arrangement may be inverted from other rack and pinion approaches and may reduce or eliminate weld spatter from entering the rack 52 and hindering movement. The lower portions 20 may comprise the pinion 48. One of the motorized devices 19 may be connected to each of the pinions 48 for driving the rack assemblies 46, which may in turn drive portions of the central portion 12 such as the upper portions 22 relative to the lower portions 20. The configuration of the rack 52 and/or pinion gear 48 within the rack assembly 46 may shield the rack 52 and/or pinion gear 48 from weld splatter.

The table 10 may comprise a controller 13. The controller 13 may be embedded in a portion of the table 10, or separate therefrom. The controller 13 may comprise one or more processors and/or one or more electronic storage devices comprising software instructions, which when executed, configure the one or more processors to cause the table 10 to function as shown and/or described herein. In exemplary embodiments, without limitation, the controller 13 may be in electronic communication with motors of the table 10, such as but not limited to motorized devices 19, 25, for controlling movement of the table 10 and/or components therefore. For example, without limitation, the controller 13 may be configured to control, in a programmable fashion, rotation of the table 10, sliding movement of the sides of the central portion 12 and/or wing portions 14, actuation of the holders 14, combinations thereof, or the like. In this manner, the table 10 may form part of a larger, assembly system, which may facilitate wholly or partially fixtureless assembly of components, subassemblies, assemblies, products, combinations thereof, or other manufacturing products.

Figure 5A:
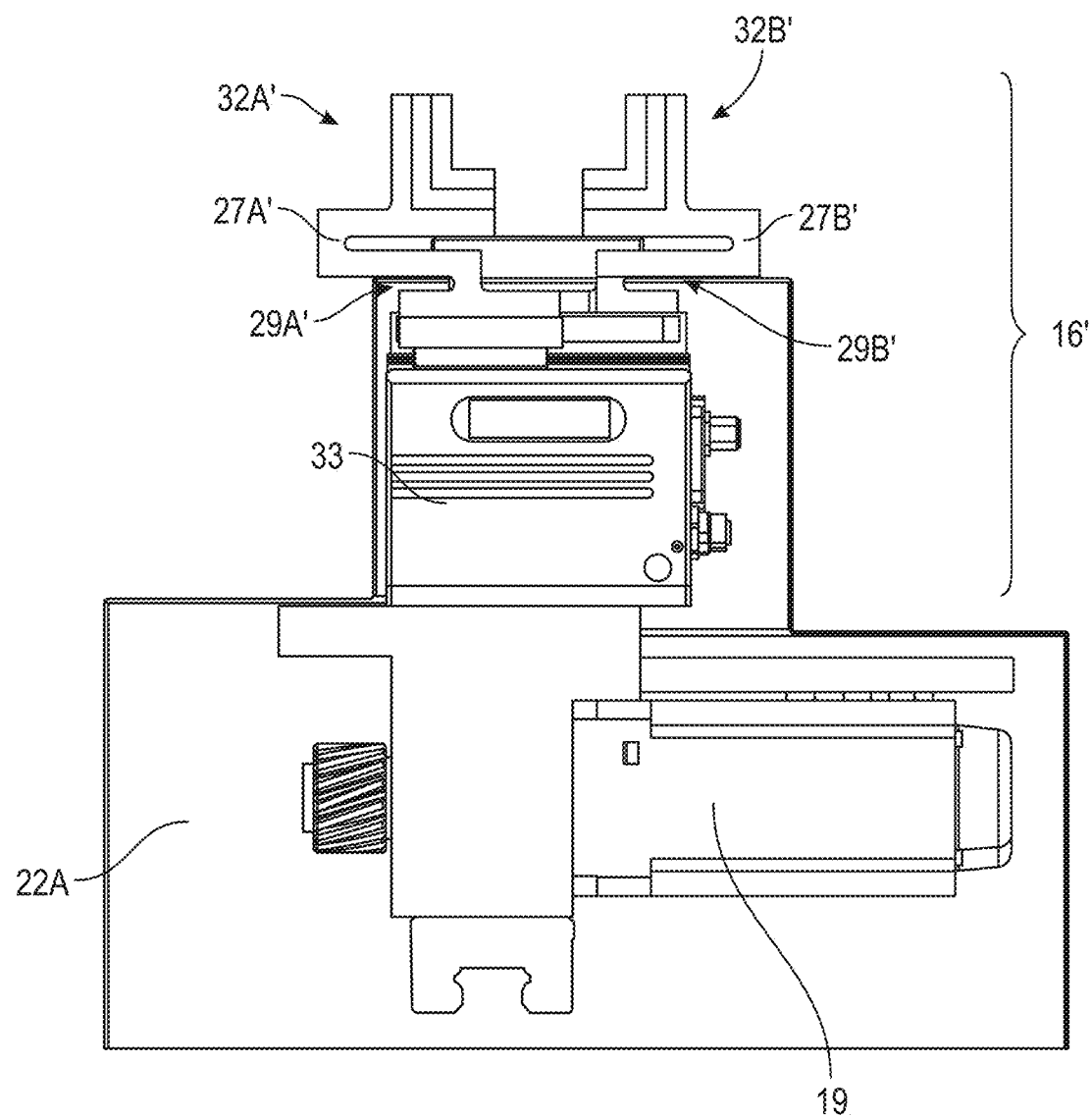
FIG. 5A is a detailed view of another exemplary embodiment of detail B of FIG. 2A.
Figure 5B:
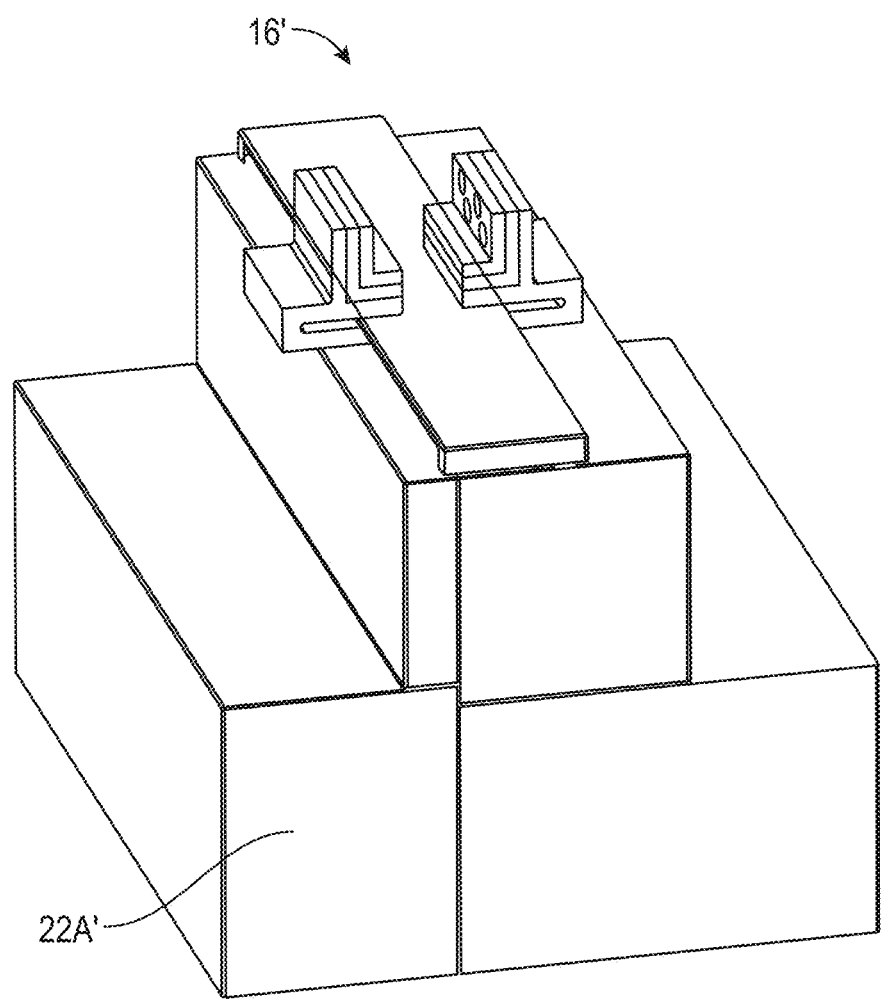
FIG. 5B is a detailed view of another exemplary embodiment of detail B of FIG. 2A.
Figure 6A:
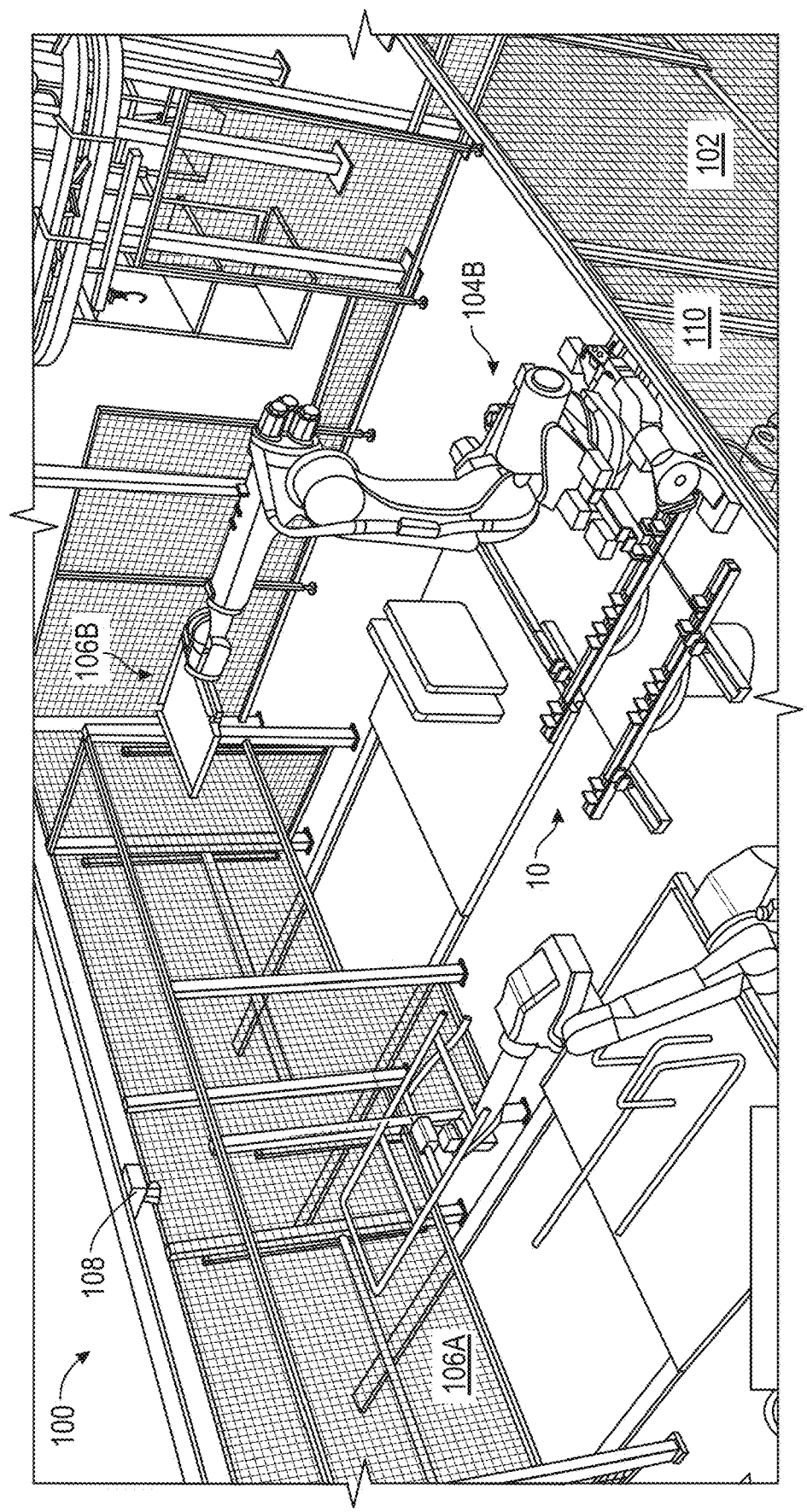
FIG. 6A is a perspective of the table of FIG. 1 in use in an exemplary automated assembly system.
Figure 6B:
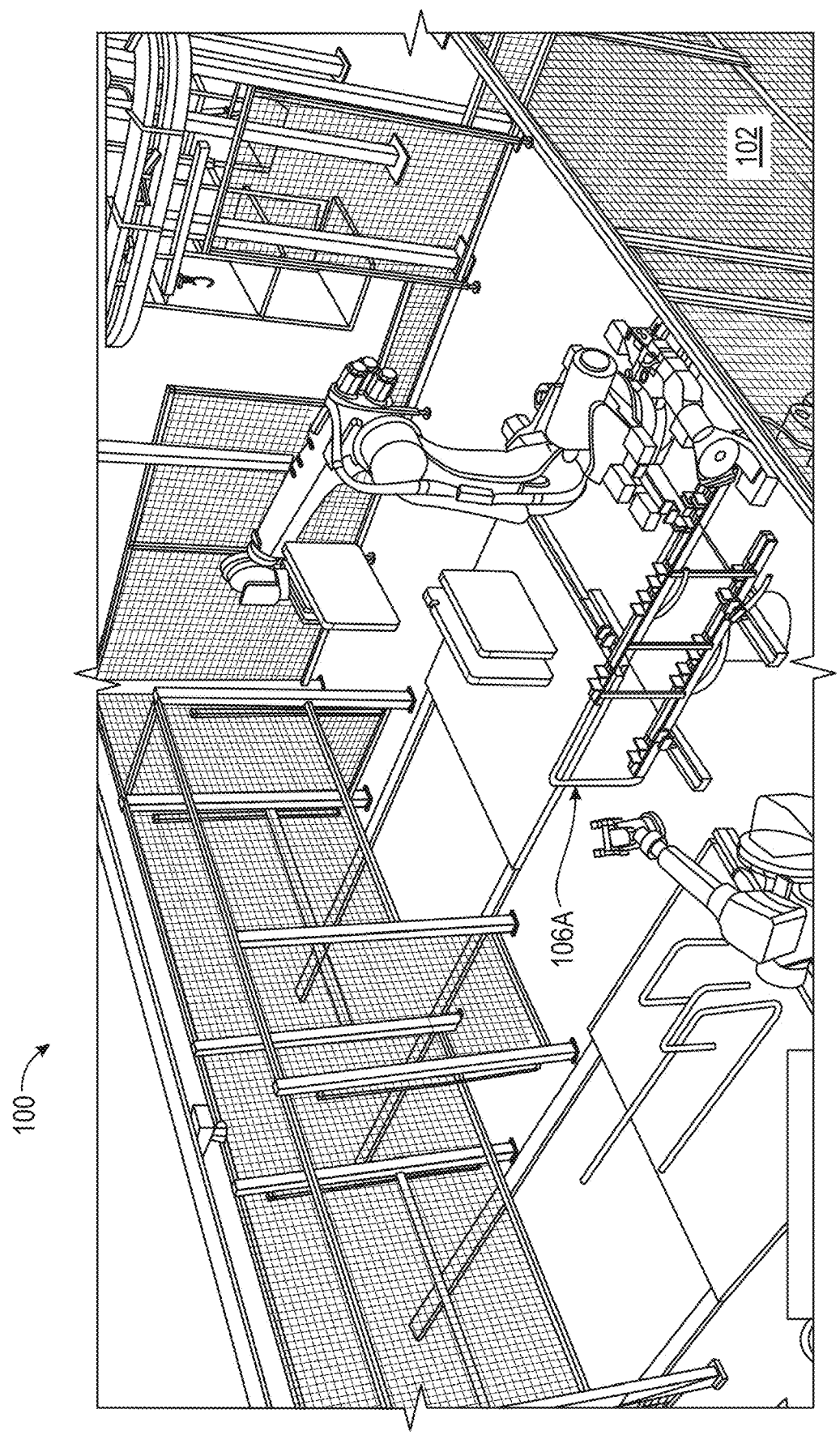
FIG. 6B is a perspective of the system of FIG. 6A undergoing further assembly.
Figure 6C:
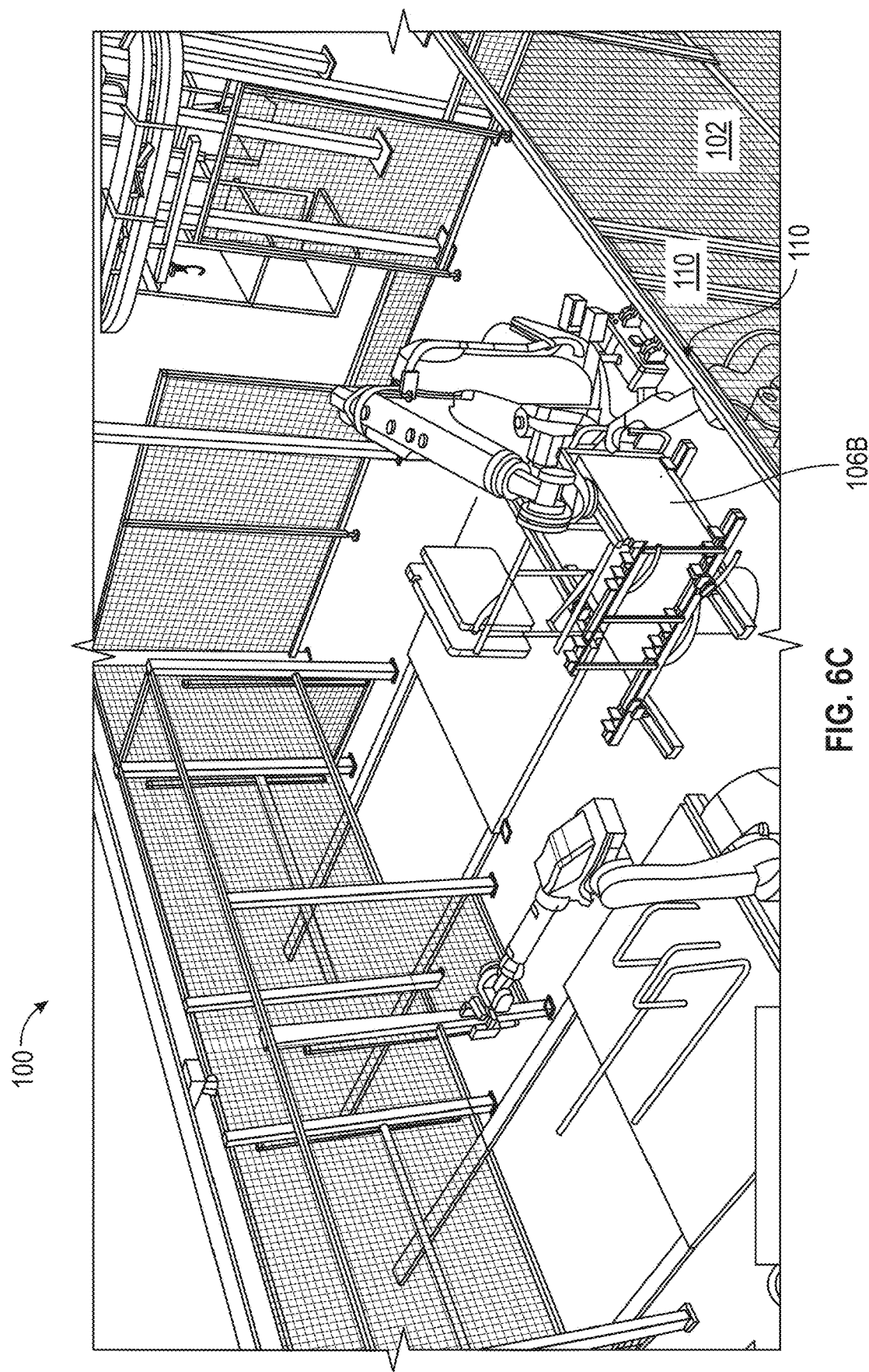
FIG. 6C is a perspective of the system of FIG. 6A undergoing further assembly.
Figure 6D:
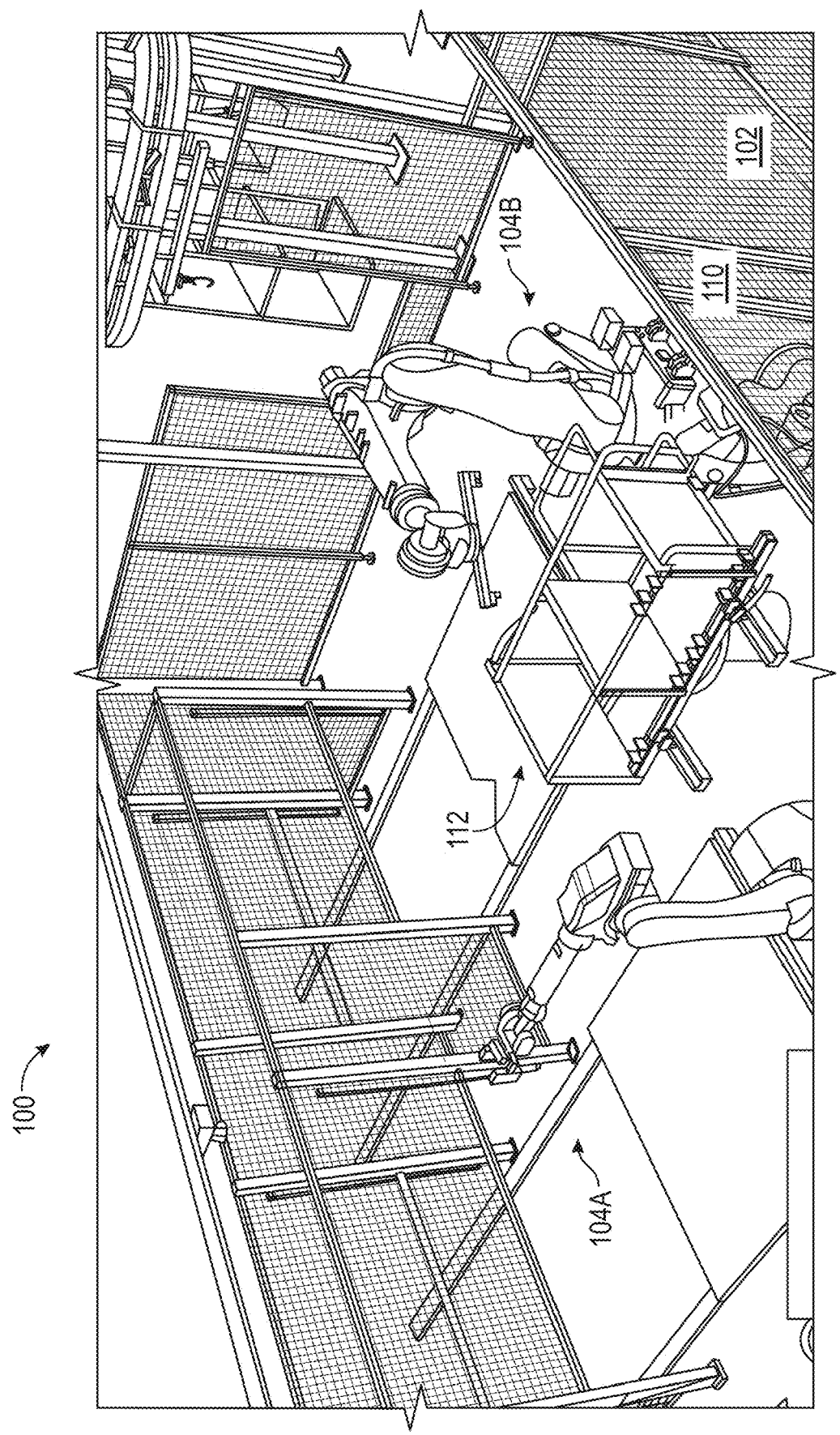
FIG. 6D is a perspective of the system of FIG. 6A undergoing further assembly.
Figure 6E:
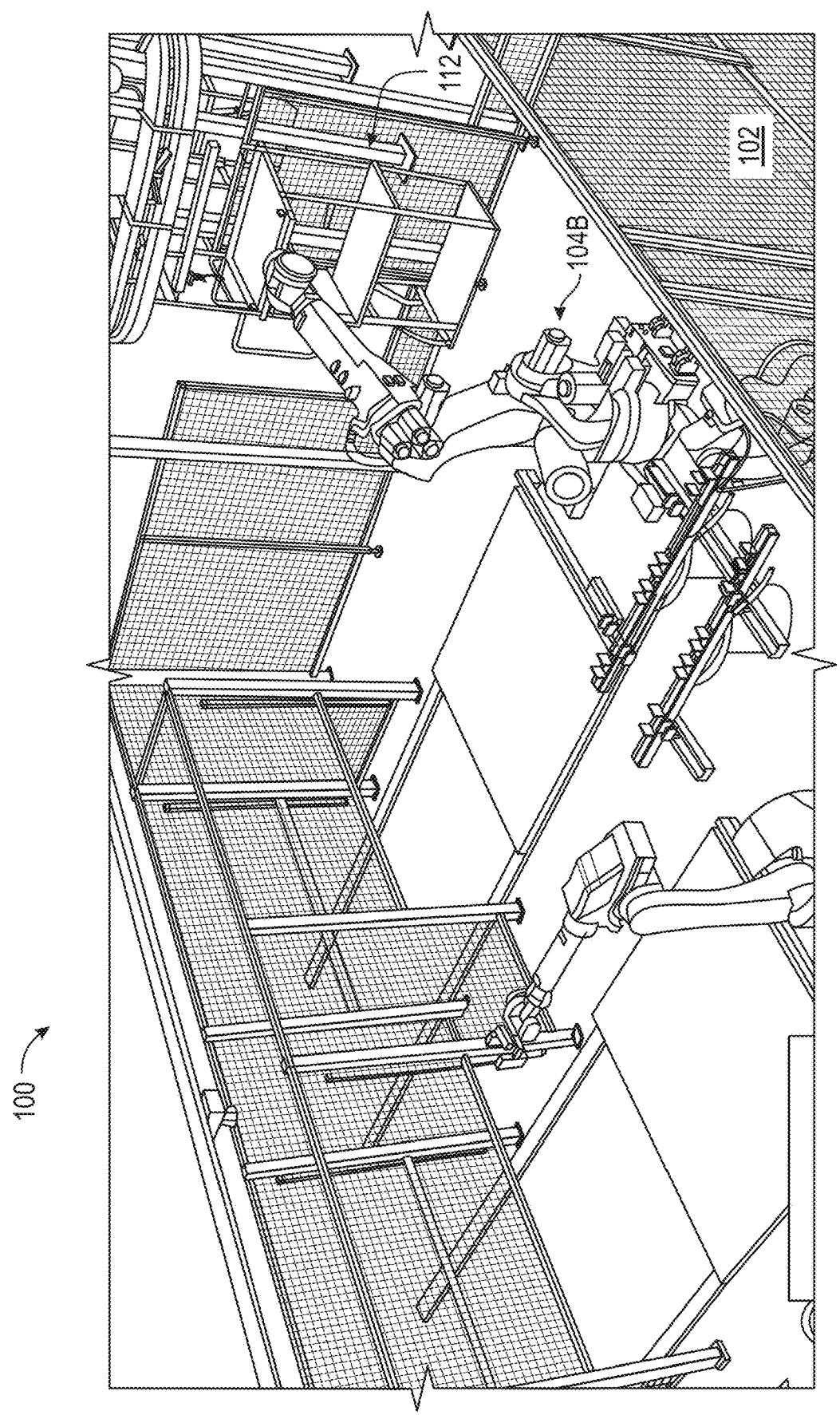
FIG. 6E is a perspective of the system of FIG. 6A with an exemplary final assembly.

FIG. 5A-5B illustrate another exemplary embodiment of the holders 16'. The holders 16' may be installed such that faces of the first and second portions 32' face fully or partially parallel to a longitudinal axis of the center portion 12 and/or wing portion 14 on which they are installed, though such is not required. Each of the portions 32' of the holders 16' may comprise a lower portion 27' and/or channel 28', each configured to accommodate one of the wires 42. Each of the portions 32' of the holders 16' may comprise a slot 29' configured to accommodate some or all of the upper portion 22'. Motors 33 may be connected to some or all of the portions 32A', 32B' to control relatively movement thereof, such as for gripping, clamping, or otherwise contacting a part. The portions of the upper portion 22' interacting with the slots 29' may serve as a track 31', attachment point, and/or stabilizing device for relative movement.

FIG. 6A through FIG. 6E illustrate an exemplary automated assembly system 100 using the table 10. The system 100 may comprise one or more handling robots 104, such as but not limited to those provided by FANUC America Corporation of Rochester Hills, Michigan (https://www.fanucamerica.com/). The robots 104 may comprise attachments or components configured for handing parts 106, such as but not limited to claws, grippers, suction devices, combinations thereof, or the like. In exemplary embodiments, without limitation, a first one of the robots 104A may be configured to handle a first type of part 106A and a second one of the robots 104B may be configured to handle a second type of part 106B. The robots 104 may comprise, and/or be in electronic communication with, a controller 102 which may be configured to command movement of the robots 104.

The controller 102 may command the robots 104 to pick up one or more parts 106 and place the parts 106 in view of one or more machine vision system 108 for identification and/or offset analysis. The machine vision system 108 may comprise one or more cameras and/or machine vision software. The same or different machine vision systems 108 may be provided within a work area, at the robots 104 themselves, combinations thereof, or the like. The machine vision system 108 may be in electronic communication with the controller 102. Some or all of the machine vision software and/or processing may be provided at the controller 102, which may be separate from, or integrated with, the machine vision system 108.

The controller 102 may be configured to command the robots 104 to place the parts 106 at the table 10 in an automated fashion. The machine vision system 108 may optionally perform an alignment scan and adjust positioning of the parts 106. Such position adjustment may be made by way of movement by the robot(s) 104A, B and/or the table 10. An additional scan may be performed by the machine vision system 108 for inspection. The positioned parts 106 may be joined by a joining robot 110. The joining robot 110 may be configured to weld the parts. The joining robot 110 may comprise those provided by FANUC America Corporation of Rochester Hills, Michigan (https://www.fanucamerica.com/). The joining robot 110 may comprise one or more attachments or components for joining, such as but not limited to welding, adhesives, combinations thereof, or the like. The machine vision system 108 may perform an inspection scan.

The material handling robots and/or joining robots 110 may comprise components of, or wholly separate, machine vision systems 108 for performing some or all of the machine vision steps shown and/or described herein.

The completed assembly 112 may be removed from the table 10, such as by the material handling robots 104.

The controller 102 may be configured to command movement of the robots 104, 110 and/or table 10. The controller 102 may interface with the controller 13 and/or the controller 102 may act as the controller 13. Movement of the table 10 and/or components thereof, such as but not limited to the motorized devices 19, 25, 33. In other exemplary embodiments, without limitation, the table 10 may not be moved or be moveable.

The controller 102 may be configured to control operation of the machine vision system 108. The scans by the machine vision system 108 shown and/or described herein are merely exemplary and are not intended to be limiting. Any number or type of scans may be utilized.

Figure 7A:
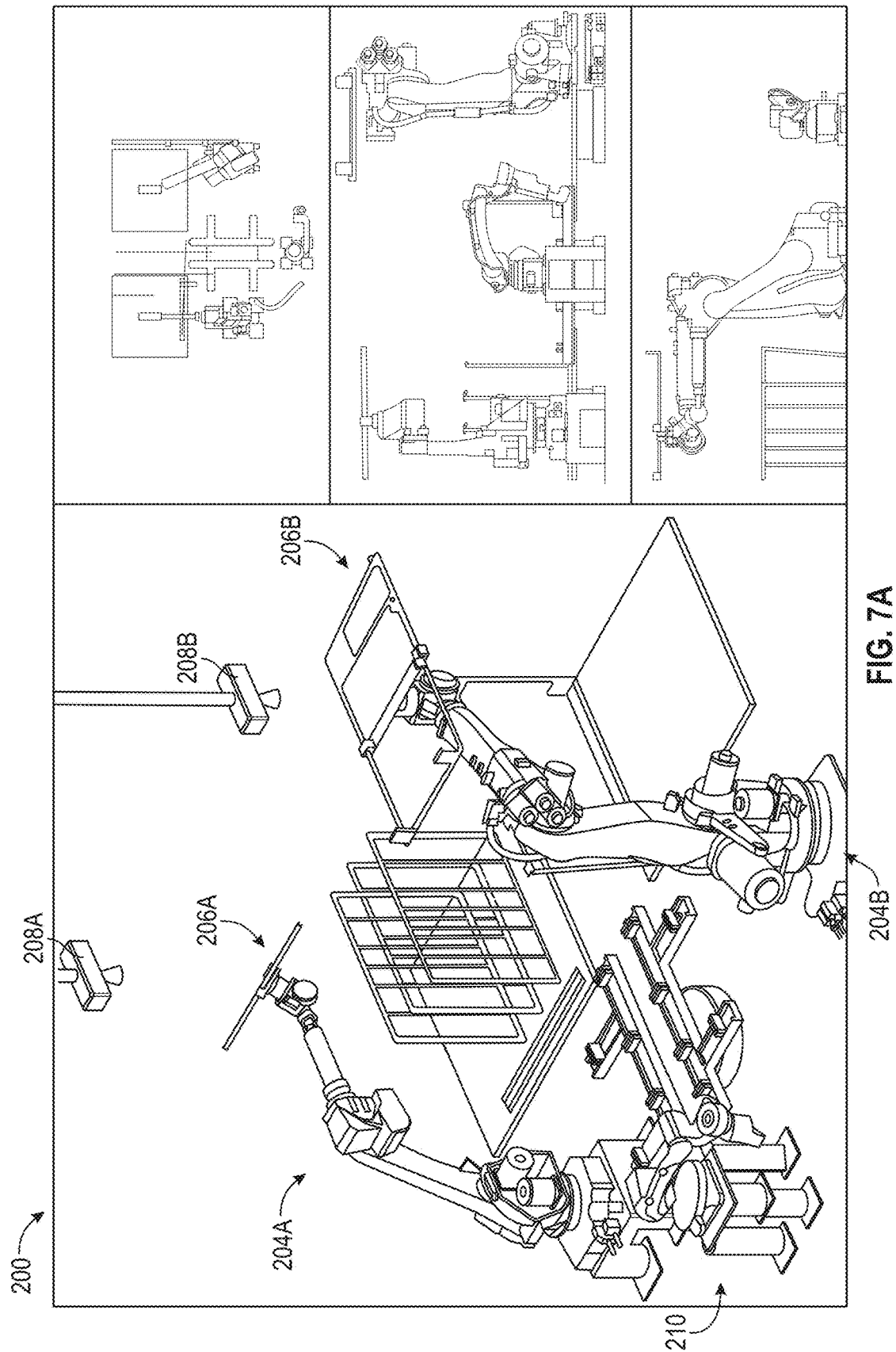
FIG. 7A is a multi-perspective of the table of FIG. 1 in use in another exemplary automated assembly system.
Figure 7B:
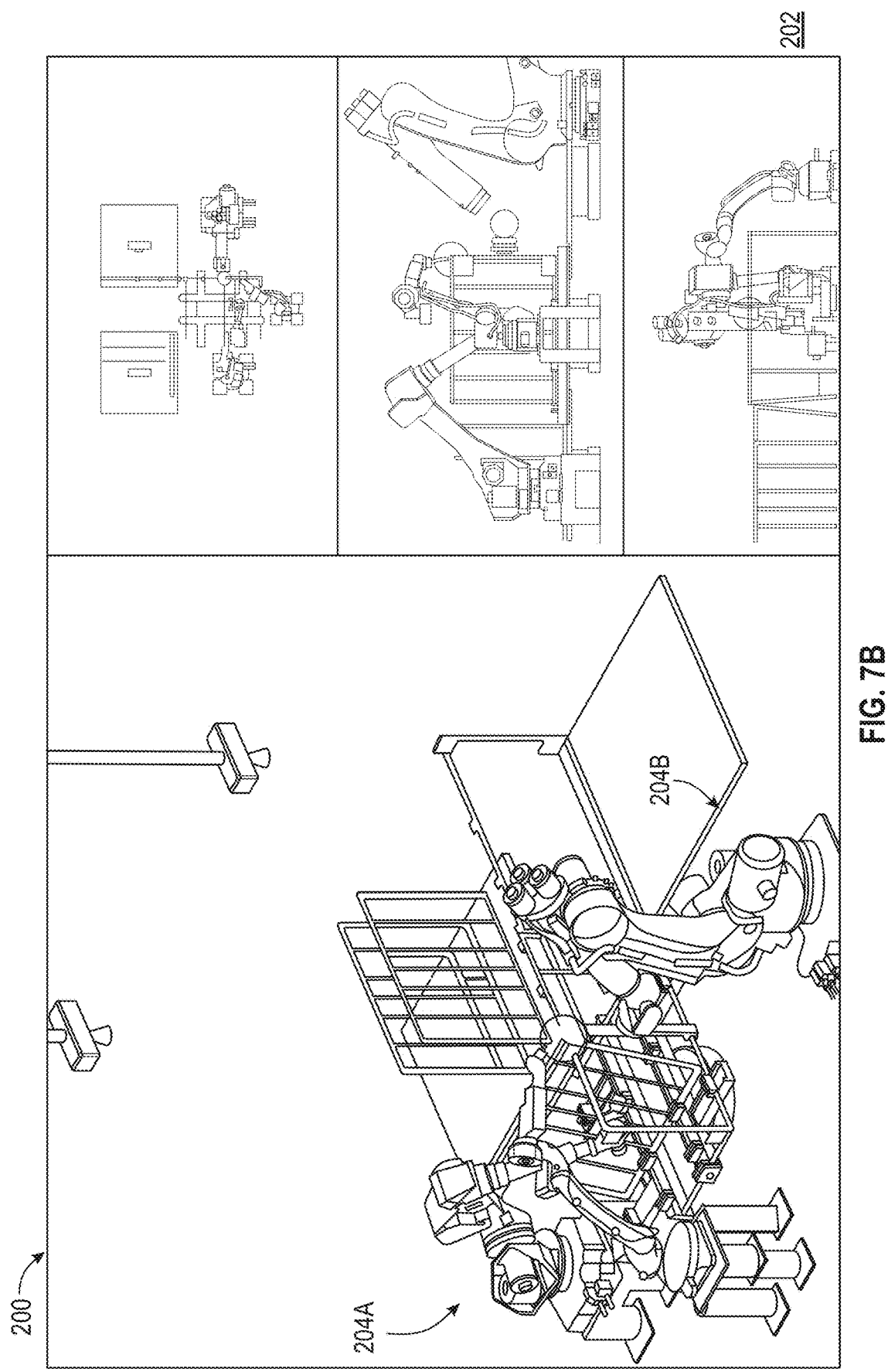
FIG. 7B is a multi-perspective of the system of FIG. 7A undergoing further assembly.
Figure 7C:
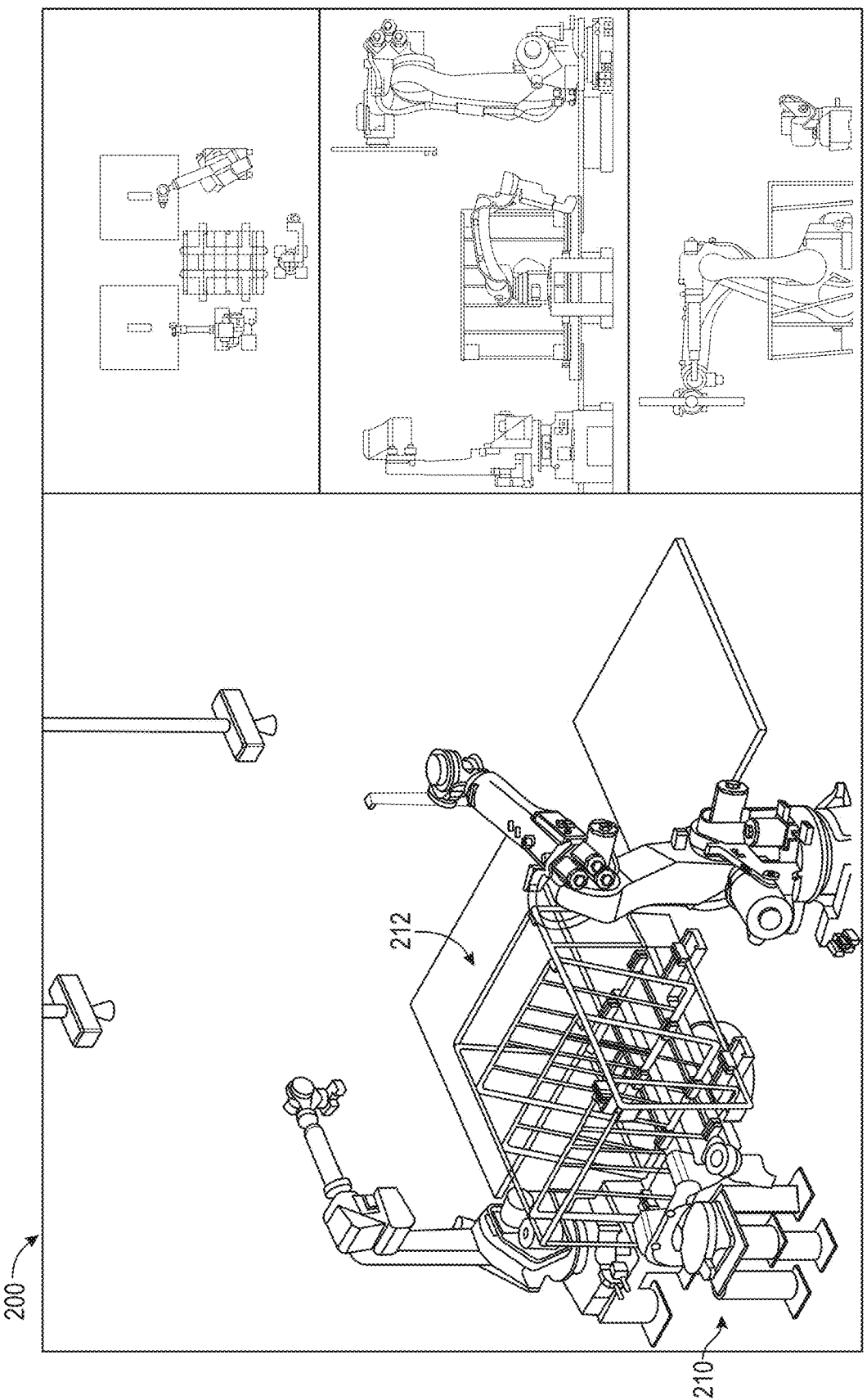
FIG. 7C is a multi-perspective of system of FIG. 7A with another exemplary final assembly.

FIG. 7A through FIG. 7C illustrate another exemplary automated assembly system 200 using the table 10. Similar items may be numbered similarly but increased by 100 (e.g., 100 to 200, 102 to 202, etc.). Any number of type of robots 204, 210, such as but not limited to material handling robots 204A, 204B, and/or joining robots 210 may be utilized to join any number and/or type of parts 206, such as first and second parts 206A, 206B to form any number or type of assemblies 212 using the table 10. The table 10 may act to temporarily secure the parts 206 so they may be joined to form the assembly 212. The machine vision system(s) 208, such as but not limited to first and second systems 208A, 208B may be used to scan the parts 206 and/or assembly 212. The controller 202 may be integrated with and/or in electronic communication with the robots 204, 210, machine vision systems 208, and/or table 10.

Multiple tables 10 may be used within a given work space.

FIG. 8 provides exemplary logic for operating the systems 100, 200.

In exemplary embodiments, without limitation, the controller 102, 202 may operate using some or all of the disclosures of one or more of US Pub. No. 2022/0016762 published Jan. 20, 2022, U.S. Pat. No. 10,095,214 issued Oct. 9, 2018, and/or U.S. Pat. No. 10,101,725 issued Oct. 16, 2018 (collectively, the "Incorporated Disclosures"), the disclosures of which are hereby incorporated by reference as if fully restated herein. The various systems and components of the Incorporated Disclosures may likewise be utilized, for example without limitation. In this manner, the table 10 may be used as part of a wholly or partially fixtureless assembly system and/or process. For example, without limitation, some or all of the disclosures of the Incorporated Disclosures may be used to perform one or more of the offset adjustments, the iterative optimization, inspection scan, and/or controller 102, 202 update steps.

Any of the steps shown and/or described herein may be performed in any order, certain steps may be repeated or omitted, and/or may be performed on an as needed basis. The iterative optimization step, in exemplary embodiments, may be performed after some or all of the scan part, rotate table, and/or place part steps for some or all parts 106, 2016 of an assembly. The results of the iterative optimization step may be used, such as by the controller 102, 202, to adjust the parts 106, 206, such as by way of the robots 104, 204, 110, 210 and/or table 106, and/or adjust the robots 104, 204, 110, 210 and/or table 106.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphone, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold, solely non-transitory signals.

What is claimed is:

1. A method for joining parts at a table, said method comprising:
   providing the table, said table comprising:
      a platform providing a work surface; and
      holders positioned about the platform, each comprising:
         a conductive surface;
         a recessed channel having a first end located adjacent to the conductive surface, a second end located below the conductive surface, and a continuous passageway extending between the first end and the second end; and
         wiring extending from the conductive surface, through the recessed channel to an electrical ground;
   locating a respective portion of a respective one of multiple parts to be joined at each of at least a subset of multiple ones of the holders; and
   joining the multiple parts by welding at the table.

2. The table of claim 1 wherein:
   the recessed channel of each of the holders comprises turns.

3. The table of claim 1 wherein:
   said table comprises motorized devices, each connected to one of the holders for moving the connected one of the holders in the at least two dimensions; and
   said method further comprises receiving commands from a controller, and operating at least some of the motorized devices to move at least some of the holders in accordance with the commands.

4. The table of claim 3 wherein:
   each of the motorized devices comprise a motor and an inverted rack and pinion connection.

5. The method of claim 3 wherein:
   at least some of the holders comprise a first portion and a second portion;
   the first portion of each of the holders comprises a first one of the conductive surfaces facing a first direction and a first one of the recessed channels located rearward of a forward face of the first one of the conductive surfaces;
   the second portion each of the holders comprises a second one of the conductive surfaces facing a second direction opposing the first direction and a second one of the recessed channels located rearward of a forward face of the second one of the conductive surfaces; and
   the first and second portions of each of the holders are moveable relative to one another.

6. The method of claim 1 wherein:
   said table comprises at least one motorized device connected to said platform for moving said work surface in three dimensions; and
   said method further comprises receiving commands from a controller, and operating said at least one motorized devices to move said work surface in accordance with the commands.

7. The method of claim 1 wherein:
   said table comprises motorized devices, each connected to one of the holders for moving the connected one of the holders in the at least two dimensions, and at least one additional motorized device connected to said platform for moving said work surface in three dimensions; and
   said method further comprises receiving commands from a controller, and operating at least some of the motorized devices to move at least some of the holders and said at least one additional motorized devices to move said work surface in accordance with the commands.

8. The method of claim 7 further comprising:
   providing a machine vision system positioned to view the table; and
   operating, by way of the controller, the motorized devices and the at least one additional motorized device based, at least in part, on data received at the controller from the machine visions subsystem.

9. The method of claim 8 wherein:
   the commands are specific to an assembly to be generated from the multiple parts.

10. The method of claim 8 further comprising:
    communicating movement instructions from said controller to at least one robot positioned adjacent to the table to grasp and move the multiple parts adjacent to one another at the table and to join said multiple parts to generate the assembly.

11. The method of claim 9 further comprising:
    performing, by way of the controller, an iterative, offset analysis and adjustment subroutine between certain operations of said machine vision subsystem and said at least one robot based, at least in part, on data received at the controller from the machine visions subsystem.

12. The method of claim 11 wherein:
    said iterative, offset analysis and adjustment subroutine is performed after placing the multiple parts at the table and before joining said multiple parts.

13. The method of claim 1 wherein:
    said table comprises a first and second member extending longitudinally in a first direction and a third, fourth, fifth, and sixth member, each intersecting one of said first and second members;
    said third, fourth, fifth, and sixth members extend away from, and outside of, said first and second members;
    said third, fourth, fifth, and sixth members have a lengthwise dimension which is shorter than a lengthwise dimension of the first and second members;
    at least one of the holders is located at each of the first, second, third, fourth, fifth, and sixth members;
    the holders located at the first and second members are oriented differently from the holders located at the third, fourth, fifth, and sixth members;
    the first and second members have a substantially equal length and extend substantially parallel with one another;

each of the third, fourth, fifth, and sixth members have a substantially equal length and extend substantially perpendicular to the first and second members;
multiple ones of the holders are located at each of the first and second members; and
the holders located at the first and second members are oriented substantially perpendicular to the holders located at the third, fourth, fifth, and sixth members.

14. The method of claim 1 wherein:
each of the holders comprise a slot located below the one or more conductive surfaces of the respective holder; and
the recessed channel of each of the holders extend about the slot of the respective holder.

15. The method of claim 1 wherein:
each of the holders comprise one or more insulating portions located behind the one or more conductive surfaces.

16. A method for automated assembly and joining using a table, said method comprising:
providing the table, said table comprising:
a platform providing a work surface;
holders positioned about the work surface, each comprising:
a conductive surface;
an insulated portion located behind the conductive surface; and
wiring extending from an electrical ground to the conductive surface; and
motorized devices, a first subset of which are each associated with one of the holders for individually moving the holders in at least two dimensions, a second subset of which are configured to move the work surface in at least two dimensions;
capturing, by way of a machine vision system, images of a work area comprising the table;
electronically transmitting the images to a controller;
electronically commanding one or more robots at the work area to move the parts to the table for joining into an assembly, and to remove the assembly from the table after joining.

17. The method of claim 16 wherein:
each of said holders comprises a sinuous recessed channel extending from a location proximate the conductive surface to a location below the conductive surface; and
said wiring of each of the holders extends within said recessed channel of the associated one of the holders.

18. The method of claim 16 further comprising, commanding, by way of the controller:
at least one of the one or more robots to pick up a first one of the parts for the assembly and move the first part to a location within a workspace;
the machine vision subsystem to perform a scan of the first part;
one or more of the motorized devices in the second subset to rotate the work surface;
at least one of the one or more robots to place the first part at one or more of the holders;
at least one of the one or more robots to pick up a second part of the parts for the assembly and move the second part to the location within the workspace;
the machine vision subsystem to perform a scan of the second part;
one or more of the motorized devices in the second subset to rotate the work surface;
at least one of the one or more robots to place the second part at one or more other ones of the holders;
at least one of the one or more robots to join at least the first and second parts to form the assembly;
performing, by way of the controller, of an iterative, offset analysis and adjustment subroutine between each of the scan of the first part, the scan of the second part, rotation of the work surface, placement of the first part, and placement of the second part;
commanding, by way of the controller, the machine vision subsystem to perform a scan of the assembly; and
determining, by way of the controller, if the assembly is within tolerance, accept the assembly if within tolerance, and reject the assembly if outside of tolerance.

19. A method for automated assembly and joining using a table, said method comprising:
commanding, by way of a controller, for each of multiple assemblies of a particular design:
a material handling robot to pick up a part for the assembly and move the part to a location within a workspace;
a machine vision subsystem to perform a scan of the part within the workspace;
one or more motorized devices of the table in to rotate a work surface of the table;
the material handling robot to place the part within one or more holders of the table;
the material handling robot to pick up a second part for the assembly and move the part to the location within the workspace;
the machine vision subsystem to perform a scan of the second part;
the material handling robot to place the second part within one or more other ones of the holders of the table;
a material joining robot to join at least the first and second part to form a first one of the assemblies;
performing, by way of the controller, an iterative, offset analysis and adjustment subroutine between each of the scan of the first part, the scan of the second part, rotation of the work surface, placement of the first part, and placement of the second part;
commanding, by way of the controller, the machine vision subsystem to perform a scan of the first one of the assemblies;
determining, by way of the controller, that the first one of the assemblies is within tolerance;
indicating acceptance of the first one of the assemblies by way of the controller;
determining, by way of the controller, that a second one of the assemblies is not within tolerance; and
indicating rejection of the second one of the assemblies by way of the controller.

20. The method of claim 19 wherein:
each of the holders of the table comprise:
a conductive surface;
an insulated portion located behind the conductive surface;
a slot located below the conductive surface;
a recessed channel extending from a location proximate the conductive surface about the slot to a location below the conductive surface;
wiring extending within the recessed channel from an electrical ground to the conductive surface; and
at least one of the motorized devices.

* * * * *